Jan. 27, 1953 A. M. HUBMAN 2,626,645
VEGETABLE PEELING APPARATUS
Filed Oct. 1, 1949

INVENTOR.
ADELBERT M. HUBMAN
BY
Hoodling and Krost
attys.

Patented Jan. 27, 1953

2,626,645

UNITED STATES PATENT OFFICE 2,626,645

VEGETABLE PEELING APPARATUS

Adelbert M. Hubman, University Heights, Ohio

Application October 1, 1949, Serial No. 119,070

1 Claim. (Cl. 146—50)

The invention relates generally to rotary work devices and more particularly to rotary work devices having a fluid drive coupling wherein a work performing liquid is used as a power driving liquid for the fluid drive coupling.

The invention will be preferably disclosed as pertaining to a peeling device for peeling objects such as potatoes, apples, carrots, peaches, onions, etc., but it is understood that the invention may apply to other rotary work devices having a fluid drive coupling wherein a work performing liquid is used as a power driving liquid for the fluid drive coupling.

An object of the invention is the provision of a rotary work device driven by a fluid coupling, in which the work performing liquid is used as a power driving liquid for the fluid coupling.

Another object of the invention is the provision of a peeling device having an abrasive element driven at a reduced speed by a fluid coupling, wherein the work performing liquid in which the objects to be peeled are immersed constitutes the same liquid for the fluid coupling.

Another object of the invention is to drive the rotary work element at a reduced speed without the use of reducing gears.

Figure 1:
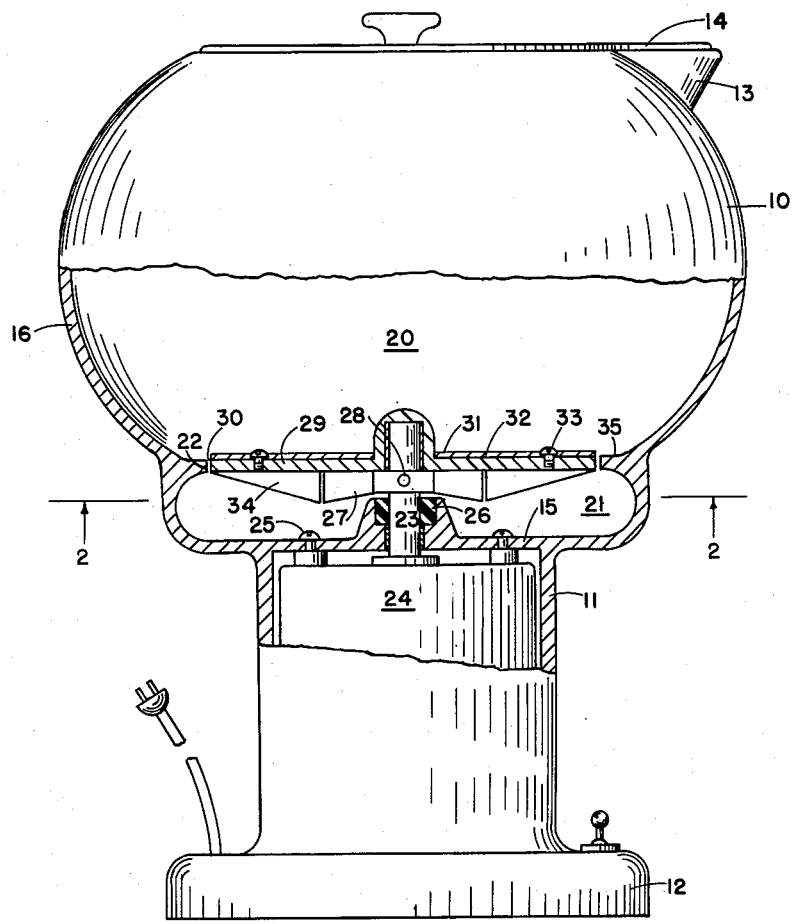
Figure 2:
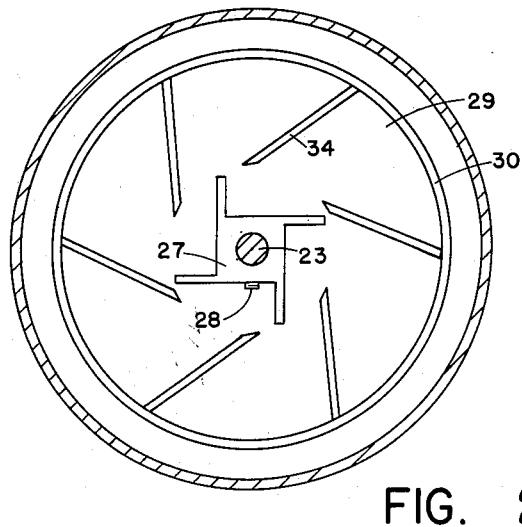

Other objects and a fuller understanding of the invention may be had by referring to the following description and claim, taken in conjunction with the accompanying drawing, in which:

Figure 1 is a side elevational view of a rotary work device embodying the invention, with certain parts shown in section to better illustrate the arrangement of the working parts; and Figure 2 is a view taken along the line 2—2 of Figure 1 and showing principally the fluid coupling parts.

In the preferred embodiment of my rotary work device, I have illustrated it in the form of a potato peeler which may be used for peeling other objects of a like nature such as apples, carrots, peaches and onions. As illustrated in the drawing, my rotary work device comprises a container 10 mounted upon the upper end of a hollow upright housing 11 having a base 12 which may rest upon any suitable work table or counter. The container is preferably globular in shape with an open top and adapted to hold a work performing liquid such as water and the objects to be peeled. To facilitate pouring of the liquid from the container after the peeling operation is finished, or for any other reason, the container is provided with a pouring lip 13. A lid 14 is adapted to cover the open top of the container including the pouring lip so that the water or other working liquid may not splash therefrom during the peeling operation.

The container may be constructed out of any suitable material and has a bottom 15 and a globular side 16 defining an upper part 20 and a lower part 21 with an internal annular surface 22 dividing the upper and lower parts. A rotary driving element or shaft 23 extends into the lower part of the container through the bottom wall 15 and is adapted to be driven by an electric motor 24 mounted in the hollow housing 11. The motor may be fastened in the hollow housing by means of screws 25 extending downwardly through the bottom wall 15 and threadably engaging the top of the motor casing or frame. A packing gland 26 is mounted around the shaft 23 to provide a liquid-tight seal.

Surrounding and mounted to the driving shaft 23 is a driving liquid impeller 27 adapted to be immersibly disposed in the lower part 21 of the container. The liquid impeller 27 may be secured to the driving shaft 23 by means of a set screw 28. The top end of the shaft 23 extends above the liquid impeller 27 and is adapted to rotatively support a rotary driven element 29 comprising a disc adapted to be immersibly disposed within the container and has an outer annular edge revolubly mounted in the internal annular surface 22 with a clearance 30 therebetween through which the water or work performing liquid may flow from the top part of the container into the bottom part.

The rotating disc has an upper surface 31 constituting the bottom of the upper part of the container and is provided with a work performing abrasive sheet 32 held on by suitable screws 33. The bottom surface of the disc is provided with fluid driven vanes 34 which, in combination with the impeller 27, constitute a fluid coupling using the water or work performing liquid as a power driving liquid for driving the disc from the vanes 34. The inside portion 35 of the container in the region immediately above and surrounding the disc extends laterally from the disc to receive peeled particles in the water or work performing liquid and keeps the particles from falling into the lower part 21 of the container through the clearance 30.

In operation, the objects to be peeled, which may be several in number, are placed in the container with the water level above the disc and surrounding the objects to be peeled. Operation of the motor 24 drives the disc through the fluid coupling comprising the impeller 27 and the vanes 34, using the water as the power driving liquid. The objects to be peeled are acted upon by the rotating abrasive sheet 32. The action is such that the objects to be peeled are tumbled or knocked about in the globular container, and as each object tumbles down and strikes the rotating abrasive sheet 32, a small bit of peeling is removed at the point of contact. The objects are automatically washed in the liquid as they are tumbled and peeled. Operation is continued until the entire surface of each object to be peeled has been contacted and peeled by the rotating abrasive sheet 32. The inside surface of the globular container may be rough or abrasive in texture so that the tumbling of the objects to be peeled against the inside wall tends to aid in hastening the peeling action. The speed at which the rotating disc is driven by the fluid coupling is less than that of the electric motor. Experience shows that a speed in the neighborhood of 500 to 700 revolutions per minute is satisfactory. This reduction in operating speed is accomplished without the use of reducing gears by means of the fluid coupling. After the peeling operation is completed, the peeled objects and the water are removed from the container. The rotary driven element 29 may be lifted off the upper end of the motor shaft 23 and removed from the container and the entire device may be washed and cleaned for a subsequent operation.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

An apparatus for tumbling articles in a liquid bath for such purposes as abrading the surface from vegetables, said apparatus comprising, a liquid-holding vessel having a bottom wall and side walls, said side walls defining an open top for introduction of workpieces and fluid into said vessel, a drive shaft passing upwardly through the said bottom wall, sealing means to prevent the passage of liquid out around said shaft, power drive means to rotate said shaft, laterally extending drive vanes carried and driven by said shaft, said vanes producing a whirl drive action upon fluid in said vessel, a horizontally revolvable table member bearing on said shaft is independently rotatable with respect thereto, driven vanes depending from said table in close proximity to said drive vanes for intercepting fluid driven by said drive vanes, said table fitting closely to portions of said side walls and thereby dividing said vessel into substantially independent vertically disposed fluid areas, whereby the lower area is actively motor driven and the upper area is driven by tumbling workpieces and the rotating table.

ADELBERT M. HUBMAN.

REFERENCES CITED

The following references are of record in the file of this patent:

UNITED STATES PATENTS

| Number | Name | Date |
|---|---|---|
| 809,582 | Robinson | Jan. 9, 1906 |
| 984,849 | Radcliffe | Feb. 21, 1911 |
| 1,199,359 | Fottinger | Sept. 26, 1916 |
| 1,832,560 | Kendig | Nov. 17, 1931 |
| 1,888,881 | Murphy | Nov. 22, 1932 |
| 1,932,246 | Kirby | Oct. 24, 1933 |
| 2,117,765 | Johnston | May 17, 1938 |
| 2,148,251 | Wortelboer | Feb. 21, 1939 |
| 2,299,020 | Jones | Oct. 13, 1942 |
| 2,453,727 | Rasmussen | Nov. 16, 1948 |
| 2,513,844 | Castner et al. | July 4, 1950 |